United States Patent [19]
Kori et al.

[11] Patent Number: 5,355,262
[45] Date of Patent: Oct. 11, 1994

[54] MAGNETIC RECORDING APPARATUS HAVING AN ADJUSTABLE ROTARY HEAD

[75] Inventors: Teruhiko Kori; Hiroshi Yamazaki, both of Kanagawa; Sakae Okazaki; Hajime Watanabe, both of Tokyo; Satoshi Tsuchiya, Kanagawa; Miki Furuya, Saitama, all of Japan

[73] Assignee: Sony Corporation, Tokyo, Japan

[21] Appl. No.: 19,879

[22] Filed: Feb. 19, 1993

[30] Foreign Application Priority Data

Feb. 28, 1992 [JP] Japan .................. 4-078531

[51] Int. Cl.⁵ .................. G11B 5/08; G11B 15/14
[52] U.S. Cl. .................. 360/64; 360/48
[58] Field of Search .......... 360/13, 14.1, 18, 19.1, 360/64, 36.1, 26, 27, 32, 48; 358/311

[56] References Cited

U.S. PATENT DOCUMENTS

| | | | |
|---|---|---|---|
| 4,549,229 | 10/1985 | Nakano et al. | 360/64 X |
| 4,799,111 | 1/1989 | Ito | 360/14.3 |
| 4,935,824 | 6/1990 | Nakano et al. | 360/48 |
| 5,132,807 | 7/1992 | Takimoto et al. | 360/32 |

FOREIGN PATENT DOCUMENTS 0196104 10/1986 European Pat. Off. .

*Primary Examiner*—Donald Hajec
*Assistant Examiner*—Thien Minh Le
*Attorney, Agent, or Firm*—William S. Frommer; Alvin Sinderbrand

[57] ABSTRACT

A recording apparatus records a first information signal in a first recording area in a helical track by a rotary head, and optionally records a second information signal in a second recording area preceding the first recording area. The switch timing of the rotary head is determined and the end of the second recording area is detected. A third information signal is recorded between the first and second recording areas at a position which is adjusted based on the switch timing of the rotary head and the detected end point of time of the second recording area.

10 Claims, 18 Drawing Sheets

MAGNETIC RECORDING APPARATUS HAVING AN ADJUSTABLE ROTARY HEAD

FIELD OF THE INVENTION

This invention relates to a magnetic recording apparatus such as a 8 mm video tape recorder, for recording video signals and PCM audio signals on helical tracks. The 8 mm video tape recorders have been disclosed in U.S. Pat. Nos. 4,551,771 and 4,542,419, and relational art of this invention has been proposed in U.S. patent application Ser. No. 838,626.

BACKGROUND OF THE INVENTION

FIG. 1 regards to a 8 mm video tape recorder and shows a pattern of helical track to be formed on the magnetic tape. In FIG. 1, the helical track has a video area with the length to correspond to 180 degree winding angles and a PCM area formed next to the video area and a V-P guard area. This PCM area contains a VSC area, a PCM data area and a PCM clock run-in area from nearest to the V-P guard area. In the video area, an FM video signal and an FM audio signal are recorded with frequency multiplied. In the PCM area, PCM audio data is recorded. In the PCM clock run-in area, clock necessary to reproduce the PCM data is recorded.

The VSC area and the V-P guard area are illustrated in FIG. 1 in enlarging a part of them. The VSC area is formed in a part of postamble and the V-P guard areas. A spacing of 0.1H between the edge of the PCM data and the edge of the VSC area is provided. At the other side edge of the VSC area and the edge of the video area, normally in the case of an NTSC system, a spacing of 2.3H is provided and in the case of a PAL system, a spacing of 2.8H is provided.

The VSC area is divided into three areas, i.e., an erase code area to record an erase code, 1.0H search mark area to record a search mark and 0.8H data area to record data. Five data blocks and one end block, a total of six blocks is recorded in the data area. The end block is constituted by 36 bits data and the end code showing that is the last data of the VSC area is recorded.

Each data block is constituted by 51 bits data and 3 bits synchronized code "S" is arranged at the head and in back of it, 6 words consisting of 1 byte (=8 bits) are arranged. The predetermined data are recorded on the first 5 words WD0 to WD4 and the error detection code is placed on the last word CRCC.

FIG. 2 illustrates the construction of a tape recorder which records VSC signals in the VSC area. A switching pulse detection circuit 1 detects the edge of switching pulse (SWP) which shifts the rotary head and outputs the detected signals thereof, to a periodic measuring counter 2. The periodic measuring counter 2 counts the clock to be outputted from the built-in oscillator and resets this count value whenever the detected signals from the switching pulse detection circuit 1 are inputted. And it also supplies the count value Yn-1 just before resetting to the subtracter 3 and simultaneously supplies the count value at an optional point of time to a coincidence detection circuit 5. A subtracter 3 subtracts the value set in advance Xn from the output Yn-1 of the periodic measuring counter 2 and outputs its difference (Yn-1−Xn). This output is latched at a latch circuit 4 and is outputted to a coincidence detection circuit 5.

The coincidence detection circuit 5 outputs coincidence signal when the count value of the periodic measuring counter 2 coincides with the value latched by the latch circuit 4. This coincidence signal is supplied to a VSC data generator 10 as a start pulse and simultaneously supplied to the reset terminal of flip-flop 7 and the set terminal of flip-flop 8. A Pn detection circuit 6 detects the data end from the PCM data to be inputted and supplies the detected signal to the set terminal of flip-flop 7. The signal to be outputted from the Q terminal of flip-flop 7 is supplied to a switch 11 and the switch 11 is "ON" when the Q output of flip-flop 7 is at "H" level and is "OFF" when the Q output is at "L" level. The erase code to be outputted from a erase code generator 9 is supplied to the rotary head (not shown) via the switch 11.

The VSC data generator 10 generates a VSC data when the start pulse is supplied from the coincidence detection circuit 5 and outputs to a switch 12. Also, when the VSC data is finished, it generates the stop pulse and supplies it to the reset terminal of flip-flop 8. The switch 12 is "ON" when the Q output of flip-flop 8 is at "H" level and "OFF" when at "L" level.

FIGS. 3 and 4 explain the function thereof. At first, the edge of switching pulse is detected at the step SP1. When the edge is detected, it proceeds to the step SP2 and the count value Yn-1 is computed at the point of time of the periodic measuring counter 2. And further it proceeds to the step SP3 and Yn-1−Xn will be computed.

More specifically, the periodic measuring counter 2 outputs the count value Yn-1 at the point of time when the switching pulse detection circuit 1 outputs the detection pulse to the subtracter 3. As shown in FIG. 4, this count value Yn-1 corresponds to the length of one field immediately before (the period of time from the rising edge of head switching pulse (or falling edge) to the falling edge (or rising edge)). The subtracter 3 subtracts Xn from this value Yn-1. As shown in FIG. 4, this Xn corresponds to the length from the position to start the VSC signal recording to the rising or falling edge of the head switching pulse. This value is set at a constant value. Therefore, Yn-1−Xn corresponds to the length from the edge immediately before of the switching pulse to the position of VSC signal recording is started. This value will be latched at the latch circuit 4.

Furthermore, the PCM data end is detected at the step SP4. When the PCM data end is detected, it proceeds to the step SP5 and recording of the erase code will be started. Then, at the step SP6 when it is judged that the count value of the periodic measuring counter 2 coincides with Yn-1 computed at the step SP3, it proceeds to the step SP7 and the erase code recording is finished. Then, it proceeds further to the step SP8 and records the VSC signal for 5 blocks.

More specifically, when the Pn detection circuit 6 detects the PCM data end, flip-flop 7 is set and the Q output becomes "H" level and the switch 11 is "ON". As a result, the erase code to be outputted from the erase code generator 9 is supplied to the rotary head (not shown) via the switch 11 and recorded on the erase code recording area of postamble and VSC areas.

On the other hand, when the count value of the periodic measuring counter 2 coincides with the value Yn-1−Xn latched by the latch circuit 4, (as shown in FIG. 4, at the time when the record starting position of the VSC signal arrives) the coincidence detection circuit 5 outputs the coincidence signal. Thus, flip-flop 7 is reset, the switch 11 is "OFF" and recording of the erase code is stopped. Also, since the VSC data generator 10 starts to generate the VSC signal by coincidence signal and flip-flop 8 is set and the switch 12 is "ON", the VSC data generated from the VSC data generator 10 is supplied to the rotary head and recorded as the search mark and VSC data. When the VSC data generator 10 generates all data to record on the VSC area, the stop pulse is generated and flip-flop 8 is reset. With this arrangement, the switch 12 is "OFF" and the recording function to the VSC area is stopped.

In the video tape recorder, there is following problems in that the recording of the VSC signal is to start at the timing after the elapse of fixed time from the edge generating timing of head switching pulse.

As shown in FIG. 5, the generating position of the edge of head switching pulse is given a tolerance of 0.8H and also a tolerance for the position gap of the PCM data end is 1.5H. As a result, the PCM data end delays 1.5H in the worst case, and if the generating timing of the head switching pulse becomes 0.8H faster, as shown in FIG. 5, the recording period of erase code becomes 0.3H (=6.8−1.5−0.8−1.8−2.3−0.1). Thus, if the recording period of erase code becomes extremely short, it is difficult to detect the PCM data end correctly. There is also a problem in that the gap from the standard position of recording position of the VSC signal has become big.

SUMMARY OF THE INVENTION

In view of the foregoing, an object of this invention is to provide a magnetic recording apparatus in which, an erase code can be recorded as long as possible and simultaneously VSC signal can be recorded on the position as close as possible to the standard position.

The foregoing objects and other objects of the invention has been achieved by the provision of a magnetic recording apparatus for recording video signals on the first area of the helical track, PCM data on the second area and VSC signals on the third area between the first and second area, by the rotary head respectively, comprising: a Pn detection circuit 23 as detection means for detecting recording area end of the PCM data, a subtracter 26 as measuring means for measuring the length from the PCM data recording area end to the switching position of the rotary head and an erase code length computing circuit 28 as adjusting means for adjusting the recording position of VSC signals corresponding to the subtracted result of the subtracter 26.

In the video tape recorder constructed as discussed above, the recording position of VSC signals is adjusted corresponding to the length from the PCM data end to the switching position of rotary head. Accordingly, the erase code can be recorded for comparatively long period and the gap between the standard position and the recording position of VSC signals can be minimized.

According to the present invention, since it is so arranged that the recording position of VSC signal will be adjusted corresponding to the length from the end of PCM data recording area to the switching position of rotary head, the recording position of VSC signal can be recorded close to the standard position, and the length between the PCM data end and the recording starting position of VSC signal can be sufficiently maintained.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
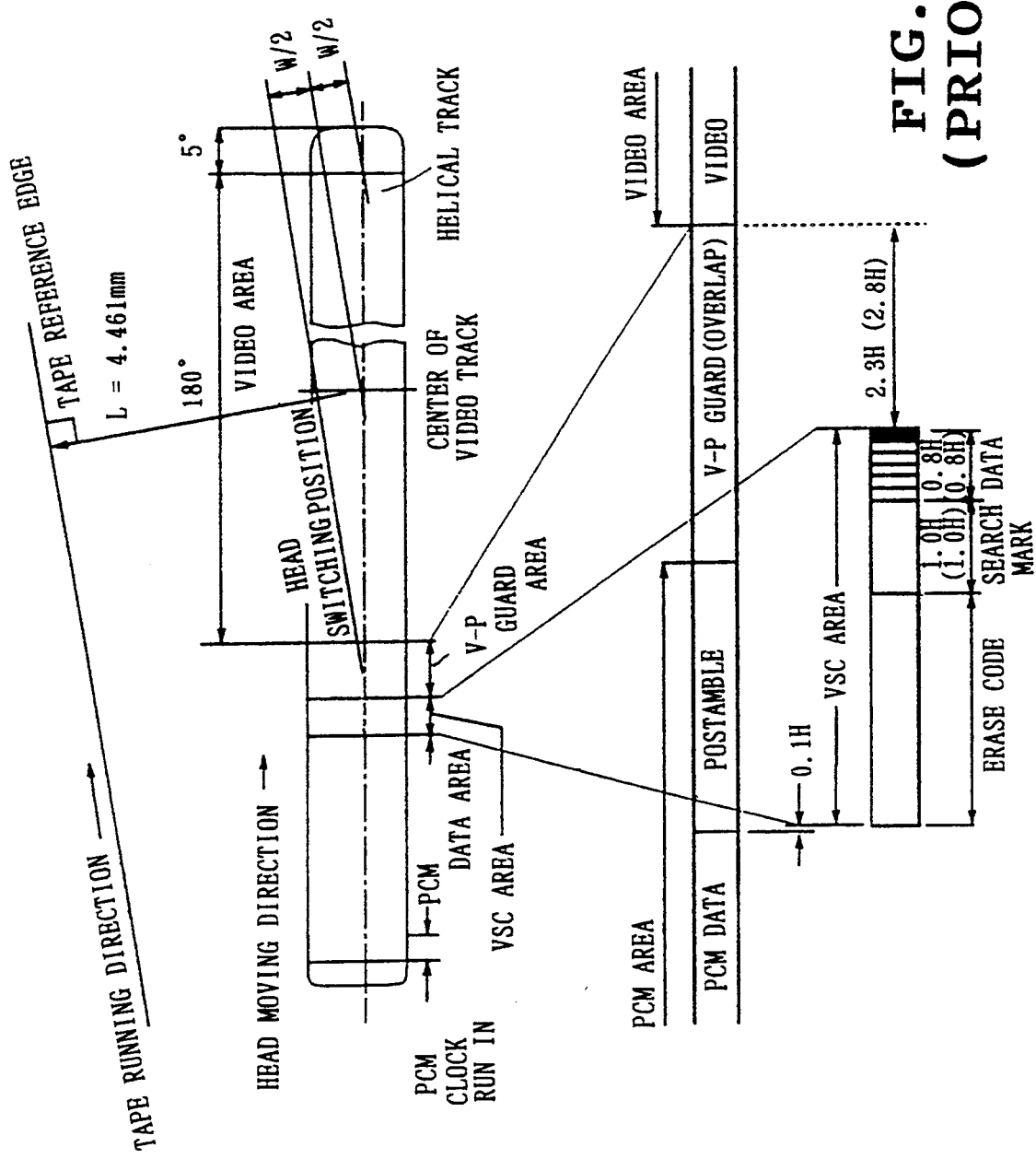
FIG. 1 is a schematic diagram illustrating the track format in 8 mm video tape recorder.
Figure 2:
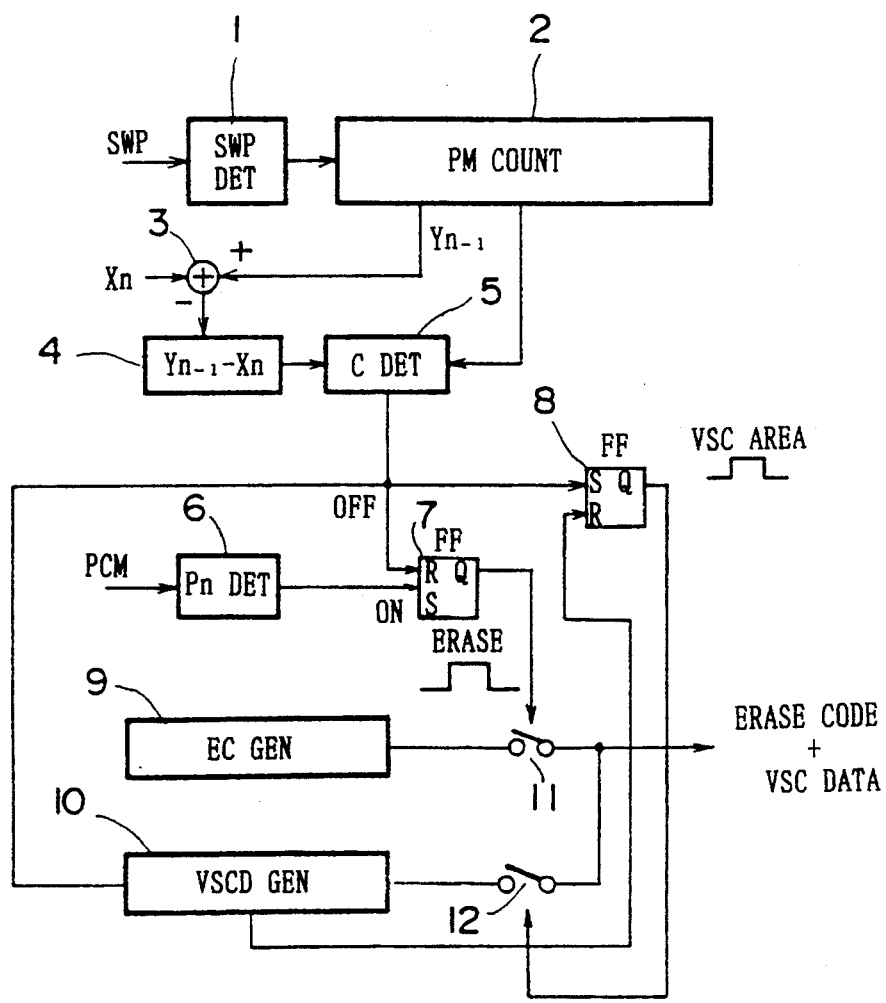
FIG. 2 is a block diagram showing the construction of one embodiment in the video tape recorder.
Figure 3:
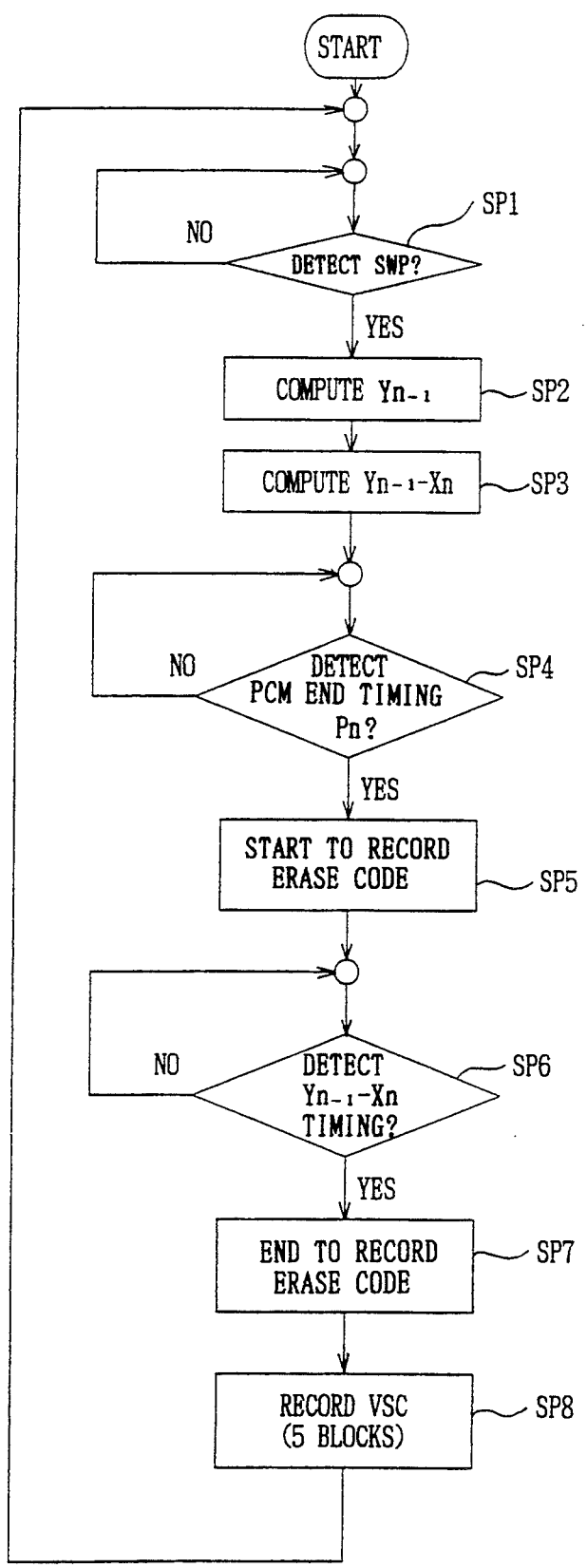
FIG. 3 is a flow chart explaining the function of FIG. 2.
Figure 4:
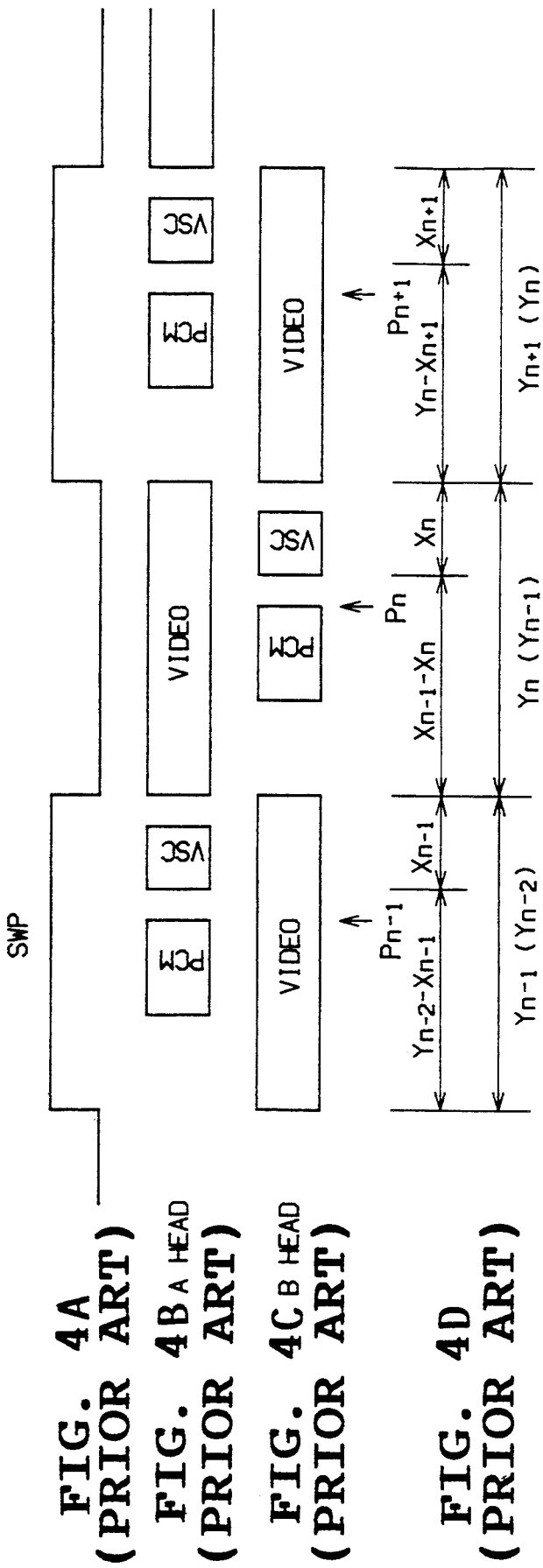
FIG. 4 is a timing chart explaining the function of FIG. 2.
Figure 5:
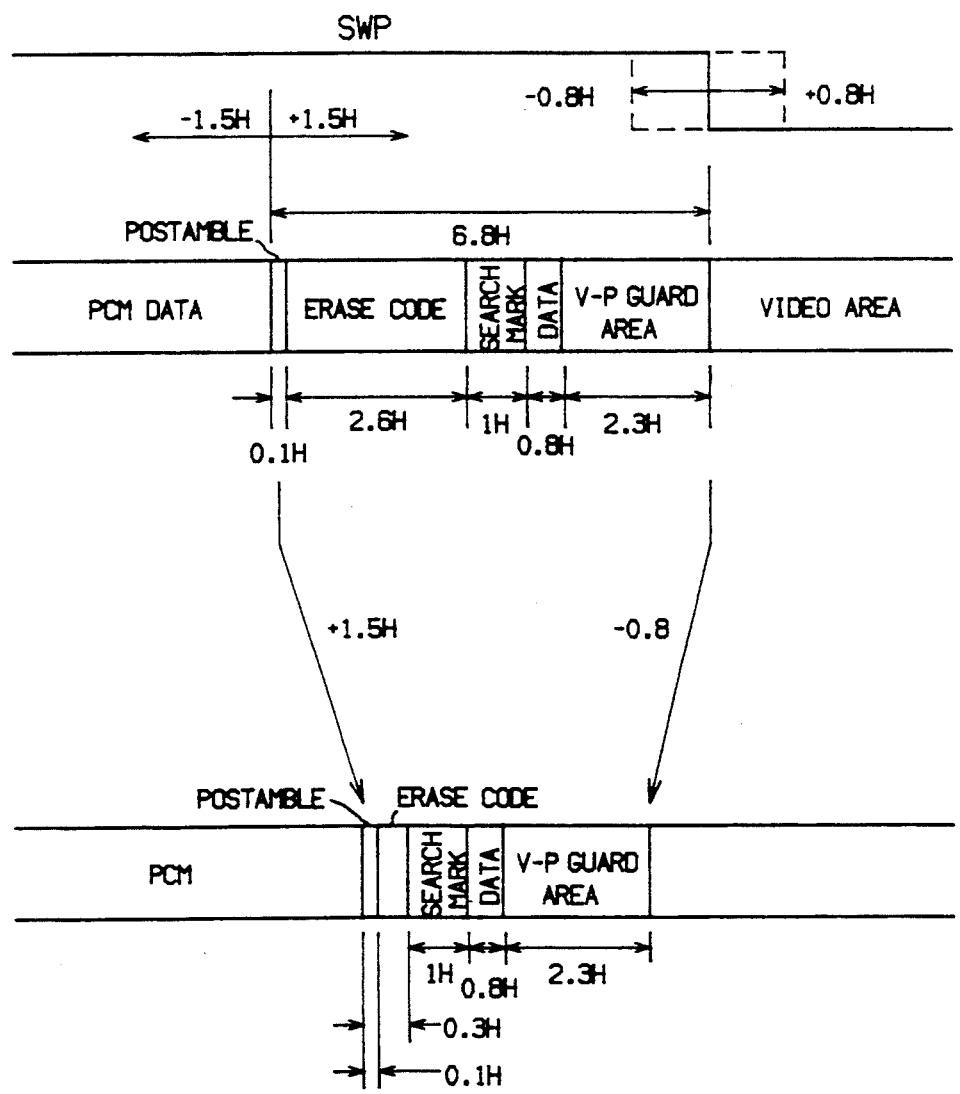
FIG. 5 is a schematic diagram explaining the track format of FIG. 2.
Figure 6:
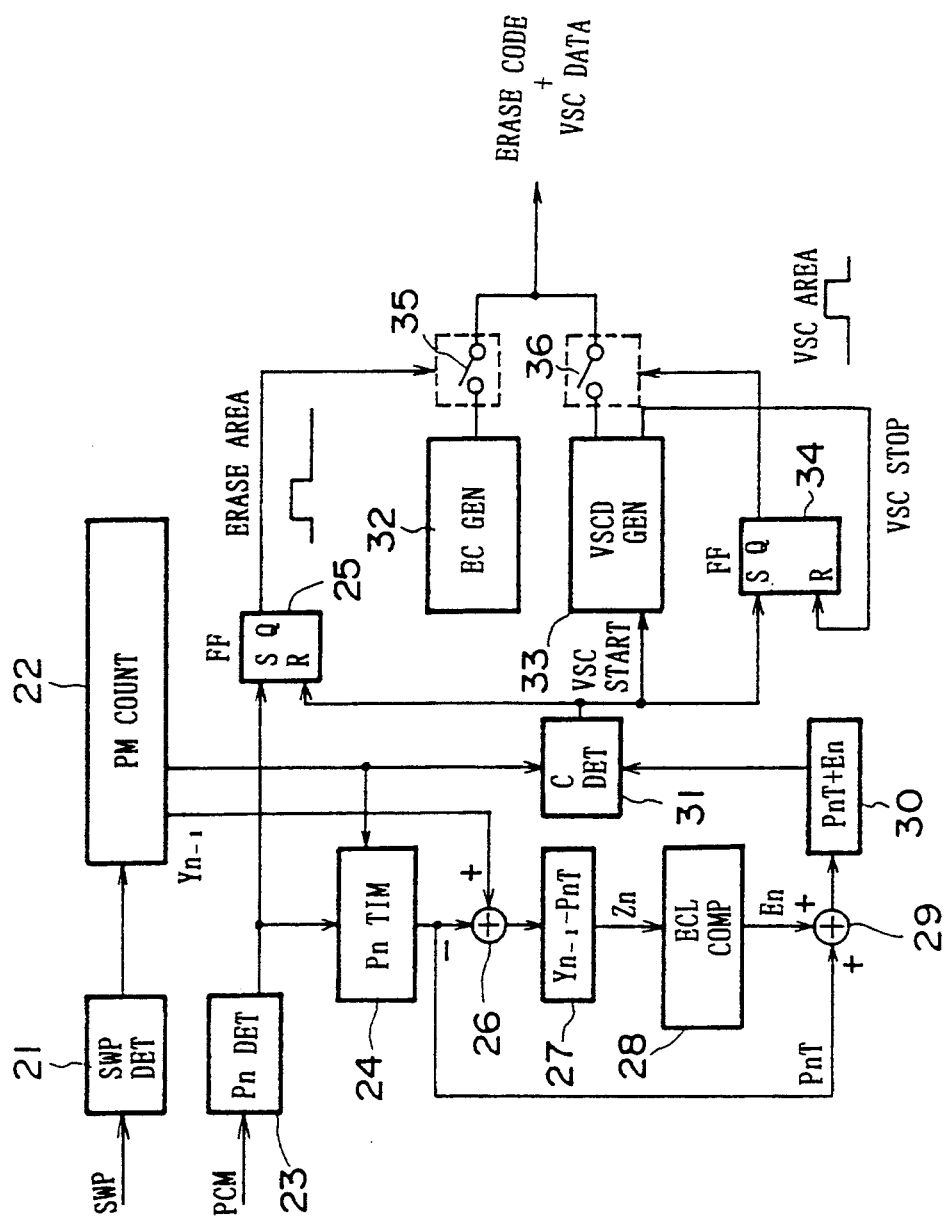
FIG. 6 is a block diagram showing the construction of one embodiment of the video tape recorder according to the present invention.

Preferred embodiments of this invention will be described with reference to the accompanying drawings:

In FIG. 6, a switching pulse (SWP) detection circuit 21 detects the edge of switching pulse to be supplied from the circuit (not shown) and supplies the resulting detection signal to a periodic measuring counter 22. The periodic measuring counter 22 measures the clock to be outputted from the built-in oscillator, and outputs its count value to a coincidence detection circuit 31. Also, this count value is reset whenever the detection signal is inputted from the switching pulse detection circuit 21 and simultaneously, the count value of immediately before Yn-1 is latched to be supplied to the subtracter 26.

A Pn detection circuit 23 detects the PCM data end to be supplied from the circuit which is not shown in FIG. 6; and it supplies the detection signal to Pn time circuit 24 and simultaneously, supplies to the set terminal of flip-flop 25.

Figure 16:
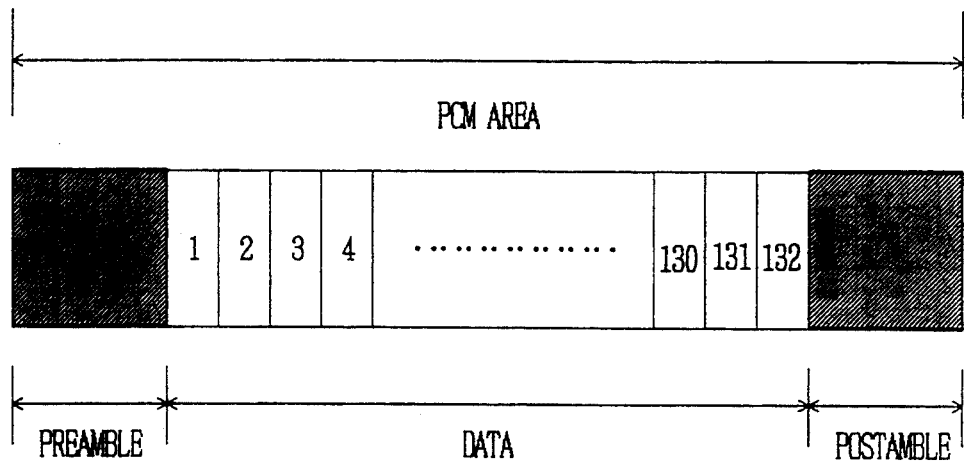
FIG. 16 is a schematic diagram explaining the Pn detection circuit 23.

The Pn detection circuit 23 which detects an end of PCM data recording area will now be explained. The PCM data recording area consists of three portions, a preamble being all "1" data, data being 132 blocks and a postamble being all "1" data, as shown in FIG. 16.

In the PCM data recording area, position information to be needed as the PCM data end position is information of the end position of the data which is the end position of 132th block.

Figure 17:
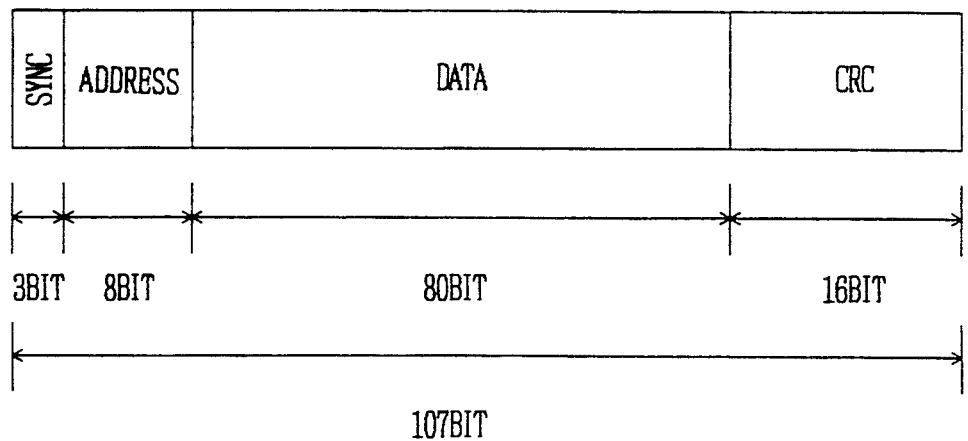
FIG. 17 is a schematic diagram explaining the data block of FIG. 16.

Here, respective data blocks are constructed as shown in FIG. 17. Therefore the number of the respective blocks is identified from reading the address data being 8 bits immediately after the sync signal of the respective blocks.

As a result, it is latched address data of the data block decided including no error after CRC error checking, and the value thus ratched is preset into a PCM end position detection counter which then is made to free run so as to be able to detect the end position of the PCM data.

Figure 18:
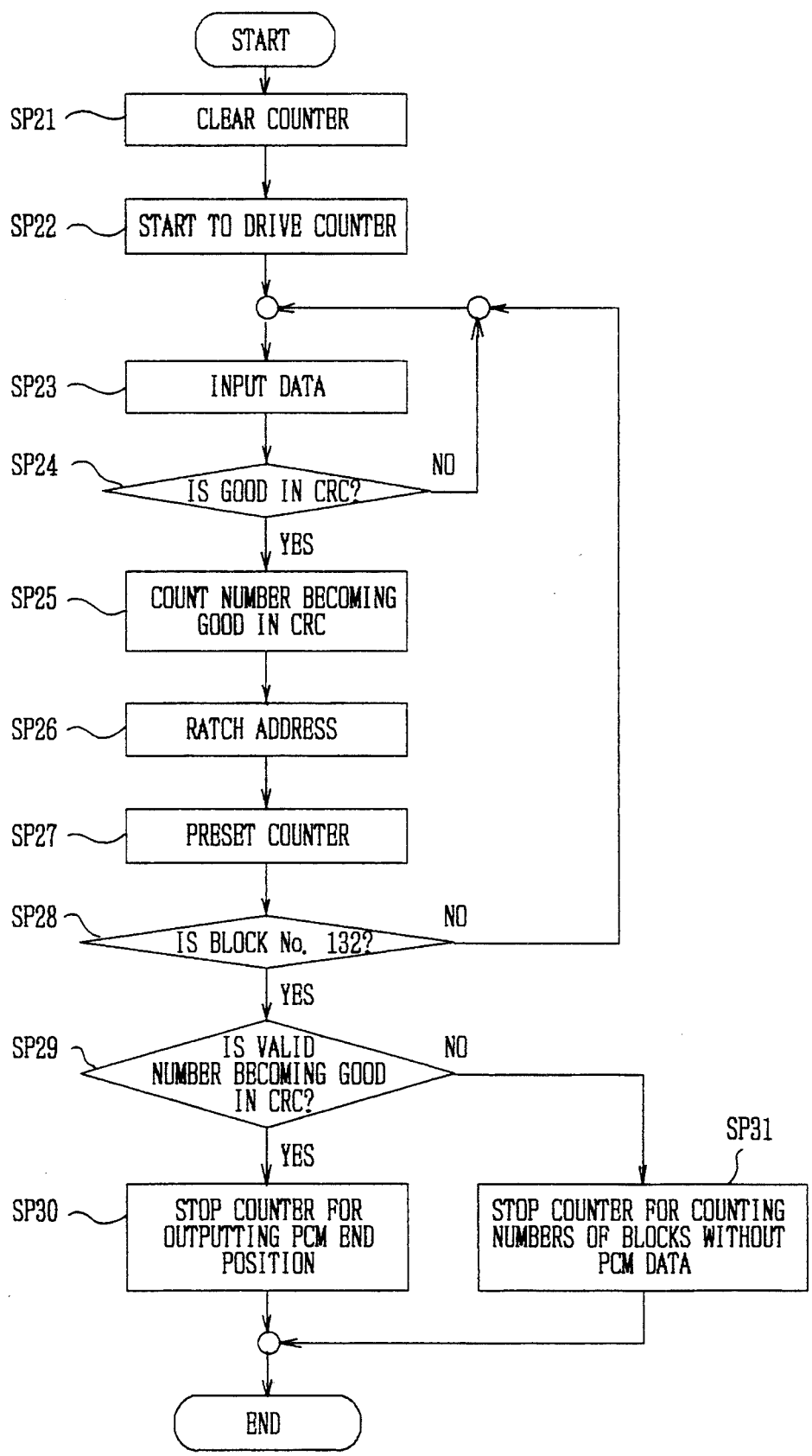
FIG. 18 is a flow chart explaining the function of the Pn detection circuit 23.

Thus operation is illustrated with a flow chart shown in FIG. 18.

Figure 19:
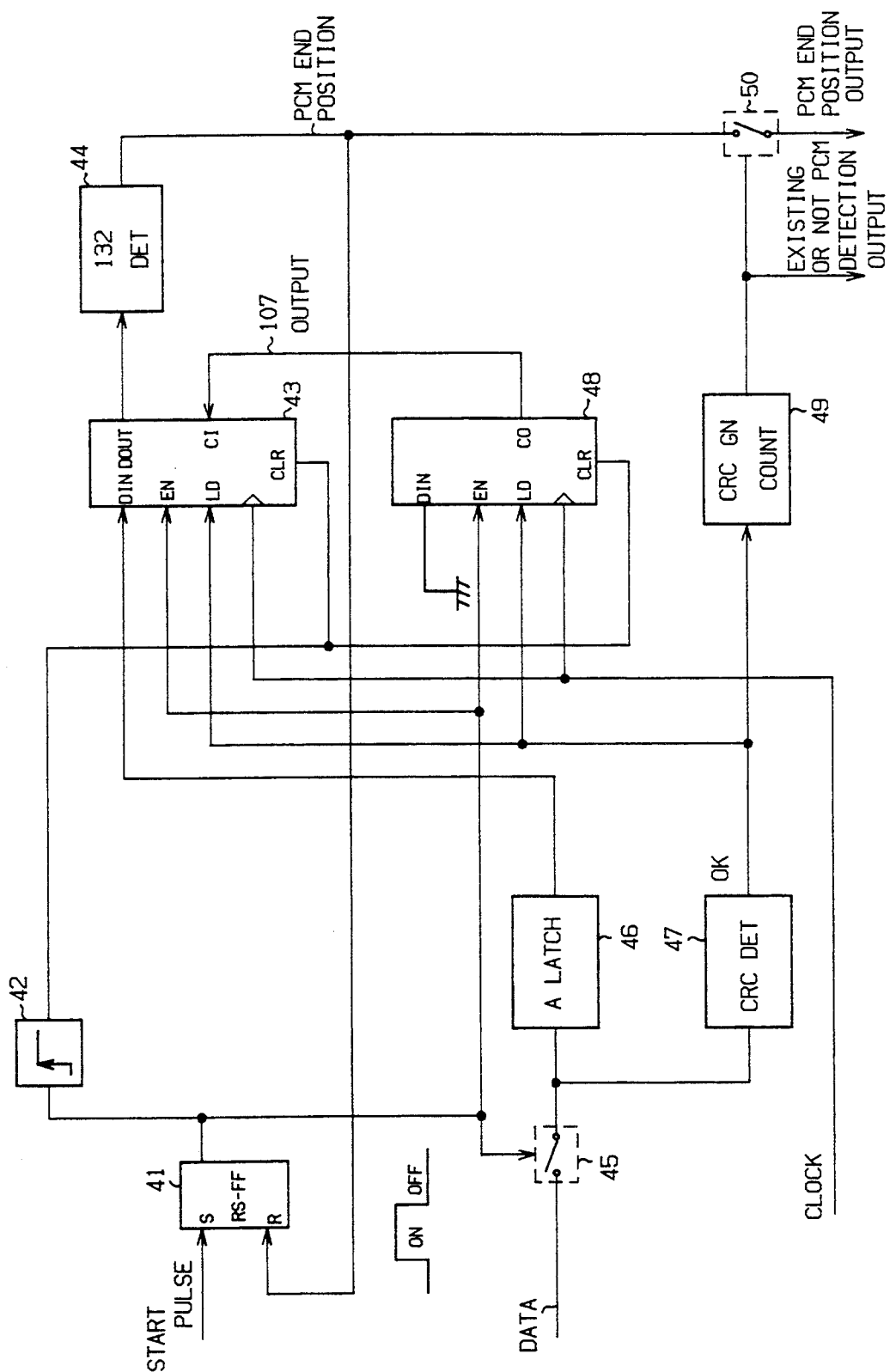
FIG. 19 is a block diagram showing the construction of the Pn detection circuit 23.

An embodiment of the Pn detection circuit 23 is illustrated in FIG. 19.

Here, the counter is free run in order to be able to decide the end position of the PCM data even if the data becomes no good by error.

Whether the PCM data exists or not decides on the basis of counted numbers becoming good in CRC error checking, and it is decided not being the PCM data in a case where the counted number is under a predetermined number.

FIG. 19 illustrates a SR-flip flop 41 set by start pulse and reset PCM end position signal, a rising edge detection circuit driven by the output signal of SR-flip flop 41, a block No. 132 counter 43 counting 107 output signal, 132 detection circuit 44 detecting the output from the block No. 132 counter, a switching circuit 45 driven by the output signal from SR-flip flop 41, an address latch 46 latching data input through the switching circuit 45, a CRC detection circuit 47 detecting a good block in CRC checking, a intra block No. 107 counter 48 free running on the basis of the clock signal, a CRC good numbers counter 49 counting the output signal the CRC detection circuit 47, and a switching circuit 50 driven by an existing PCM signal from CRC good numbers counter 49.

When the detection signal is inputted from the Pn detection circuit 23, the Pn time circuit 24 latches the count value of the periodic measuring counter 22 as PnT which then outputs to the subtracter 26 and the adder 29. The subtracter 26 subtracts the value PnT latched by the Pn time circuit 24 from the latch output of the periodic measuring counter 22 Yn-1. This subtracted value Yn-1−PnT is latched by the latch circuit 27 and the value latched is supplied to the erase code length computing circuit as Zn.

Figure 9:
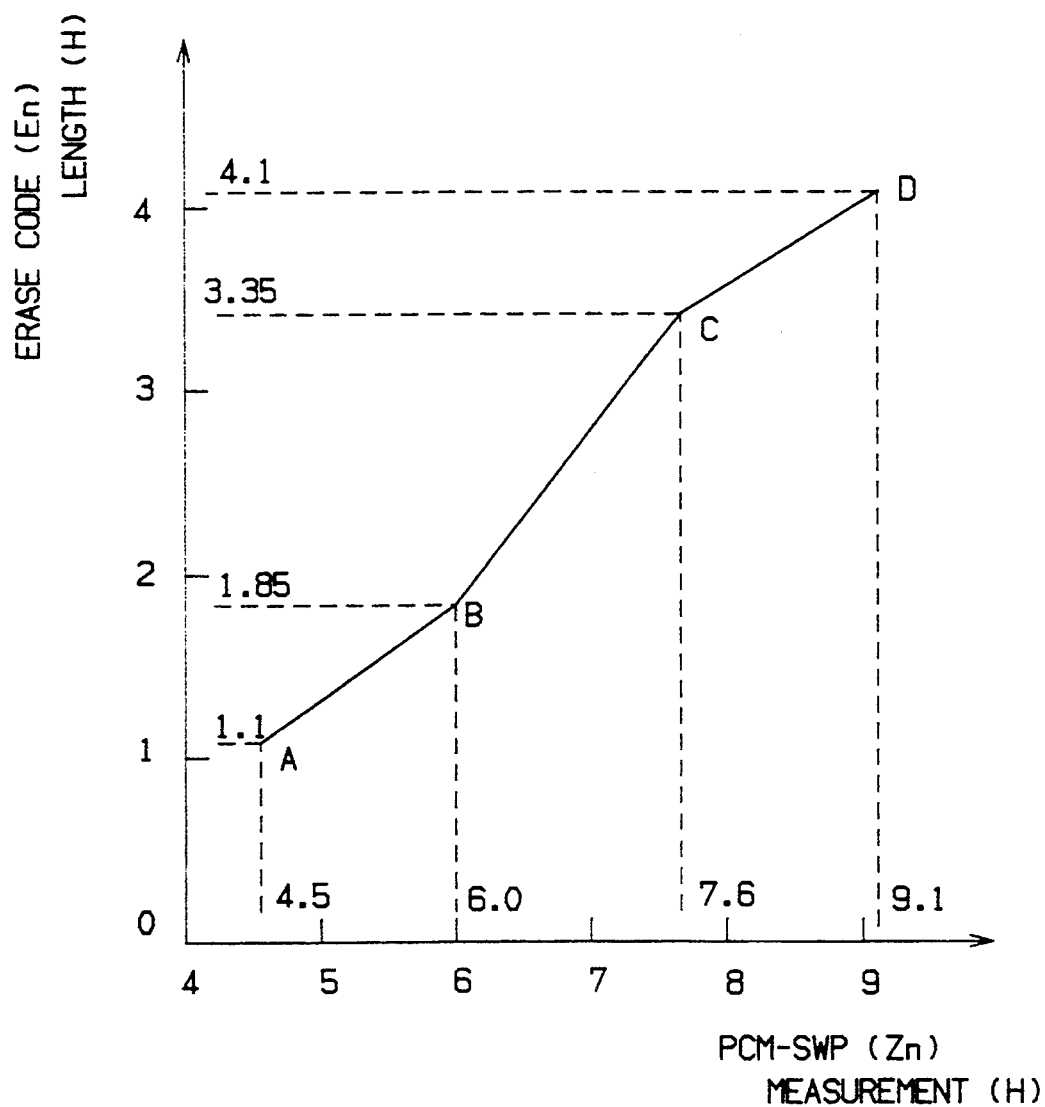
FIG. 9 is a table explaining a conversion table of Zn and En of the erase code length computing circuit 28 according to the embodiment of FIG. 6.

The erase code length computing circuit 28 has a table as illustrated in FIG. 9 for example, and after converting the data Zn inputted into the erase code length En, outputs to the adder 29. The adder 29 adds the data PnT to be outputted from Pn time circuit 24 and the erase code length En to be outputted from the erase code length computing circuit 28, and outputs the value added PnT+En to the latch circuit 30. The latch circuit 30 latches the data PnT+En inputted and supplies it to the coincidence detection circuit 31.

The coincidence detection circuit 31 compares the value latched at the latch circuit 30 and the count value of the periodic measuring counter 22, and when both values are coincided, supplies coincidence signal to the reset terminal of flip-flop 25 and the set terminal of R-S flip-flop 34, and simultaneously, outputs it to the VSC data generator 33 as VSC start signal.

Q output of flip-flop 25 will be utilized as "ON/OFF" signal of the switch 35. The switch 35 is "OFF" when the Q output of flip-flop 25 is at "H" level and "OFF" at the time of "L" level. When the switch 35 is "ON", the erase code to be outputted from the erase code generator 32 is supplied to the rotary head which is not shown in FIG. 6. The Q output of R-S flip-flop 34 is also used as shifting signal of the switch 36 and the switch 36 is "ON" when the Q output of flip-flop 34 is at "H" level and is "OFF" at the time of "L" level. When the switch 36 is "ON", a VSC data outputted from the VSC data generator 33 is supplied to the rotary head which is not shown in FIG. 6. The VSC data generator 33 also outputs a VSC stop signal to the reset terminal of R-S flip-flop 34 at the timing of VSC data end.

Figure 7:
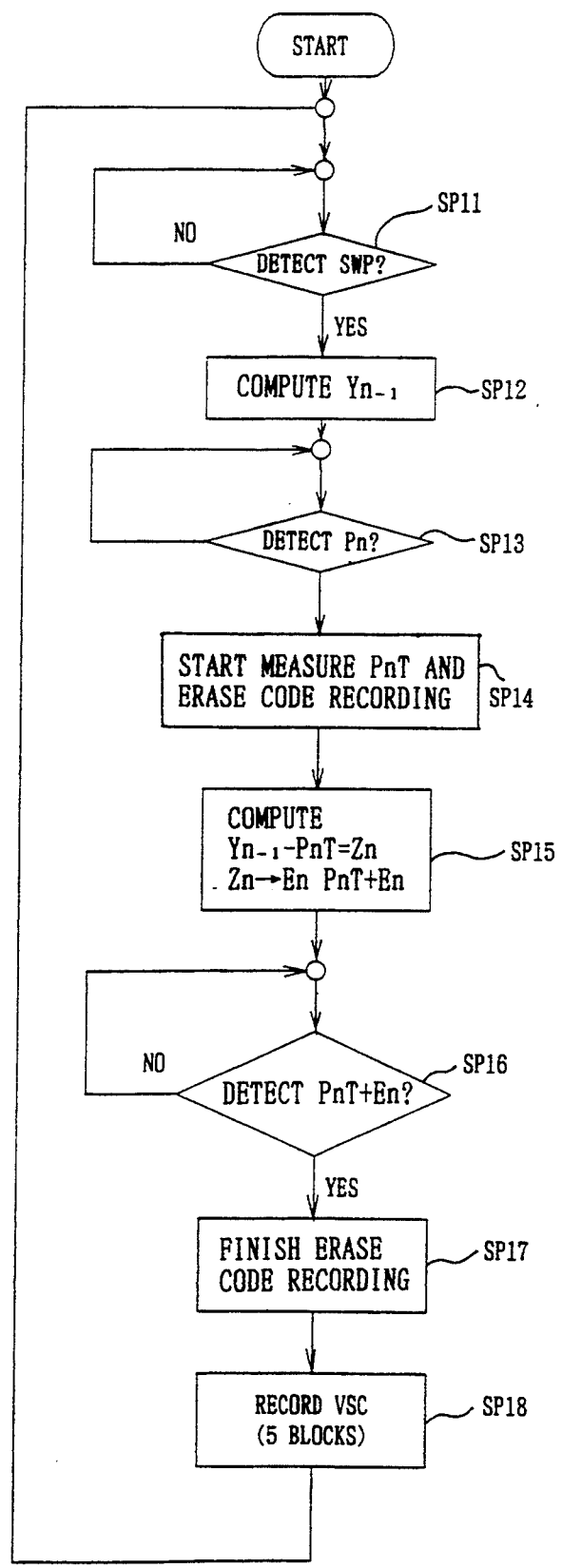
FIG. 7 is a flow chart explaining the function of the embodiment of FIG. 6.
Figure 8:
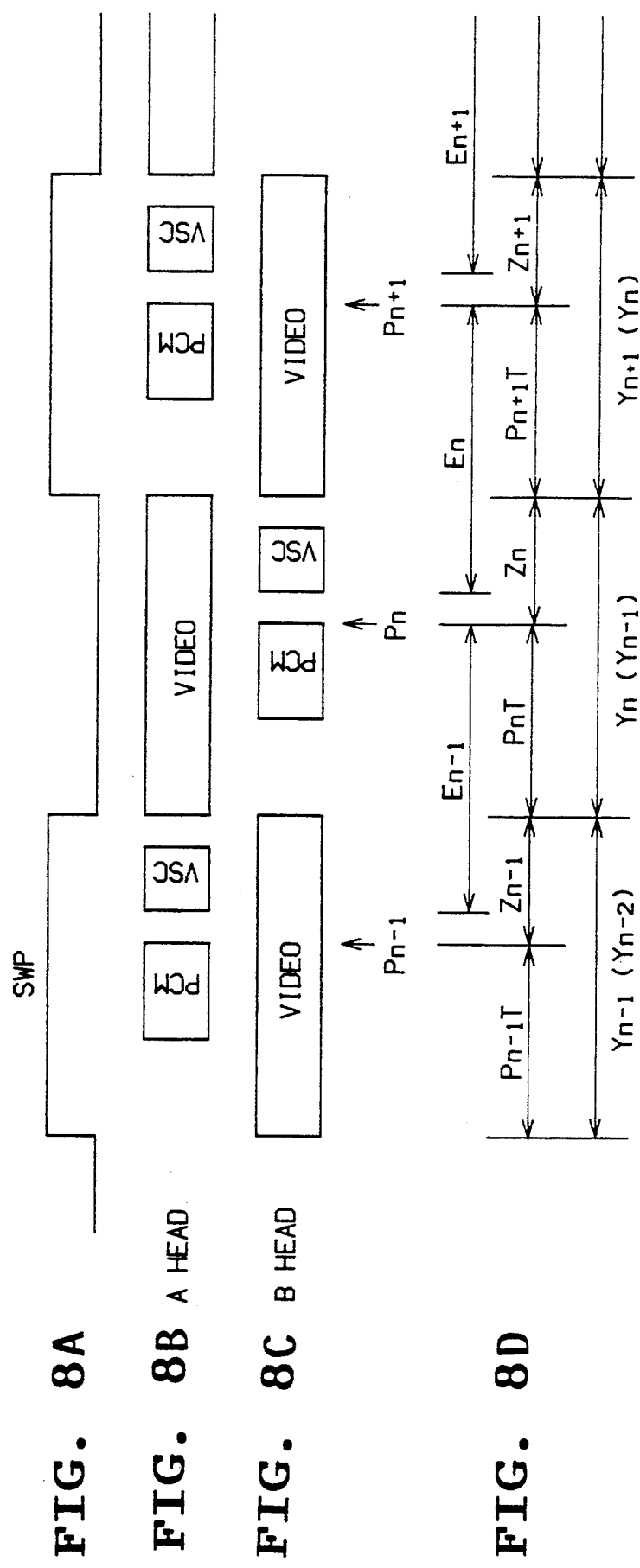
FIG. 8 is a timing chart explaining the function of the embodiment of FIG. 6.

Now, the function of the above referring to a flow chart of FIG. 7 and a timing chart of FIG. 8 will now be explained. At first, on the step SP11, the edge of switching pulse for shifting the rotary head A and the rotary head B will be detected. When the edge of switching pulse is detected, it proceeds to the step SP12 and calculates the length Yn-1 of the former edge of head switching pulse and the edge now detected on the step SP11. Then, it proceeds to the step SP13 and detects the PCM data end Pn. When the PCM data end Pn is detected at the step SP13, it proceeds to the step SP14, and the length PnT from the former edge of head switching pulse to the position where the PCM data end Pn is detected at the step SP13, will be calculated. At this time, recording of the erase code will be also started.

Then, it proceeds to the step SP15 and subtracts PnT calculated at the step SP14 from Yn-1 calculated at the step SP12 and a value Zn (=Yn-1−PnT) will be obtained. As shown in FIG. 8, this value Zn corresponds to the length from the PCM data end to the edge of switching pulse. From this value Zn the length of erase code En will be obtained from a table illustrated in FIG. 9. As shown in FIG. 8, this value En corresponds to the length of the PCM data end and the position where the VSC signal starts recording. At the step SP15, PnT and En are added further and PnT+En will be obtained. As shown in FIG. 8, this PnT+En corresponds to the length from the former edge of switching pulse to the position where the VSC signal starts recording.

Then, at the step SP16, the count value of the periodic measuring counter 22 is judged whether it coincides with PnT+En calculated at the step SP15, and when the count value coincides, it proceeds to the step SP17 and finishes the erase code recording started at the step SP14. Then it proceeds to the step SP18 and executes the VSC signal recording for 5 blocks.

The above function can be explained referring to a block diagram of FIG. 6 as follows: i.e., the periodic measuring counter 22 latches the count value as Yn-1 at the time when the switching pulse detection circuit 21 detects the edge of switching pulse. Also, since flip-flop 25 is set when the Pn detection circuit 23 detects the PCM data end, the switch 35 becomes "ON", and the erase code to be outputted from the erase code generator 32 is supplied to the rotary head add the recording of erase code is started.

On the other hand, when the Pn detection circuit 23 detects the PCM data end, the count value of the periodic measuring counter 22 of that point of time is latched as PnT at the Pn time circuit 24. PnT is subtracted from Yn-1 at the subtracter 26 and the data Yn-1−PnT is latched by the latch circuit 27. This latched data is supplied to the erase code length computing circuit 28 as Zn. The erase code length computing circuit 28 converts this data Zn into the erase code length En and outputs to the adder 29. The adder 29 adds the position of PCM data end PnT to the erase code length En and outputs the data PnT+En. This data is latched by the latch circuit 30 and is supplied to the coincidence detection circuit 31.

The coincidence detection circuit 31 monitors whether the count value of the periodic measuring counter 22 coincides or not with the value latched by the latch circuit 32 PnT+En, and when it coincides, outputs the coincidence signal. Since flip-flop is reset by this coincidence signal, the switch 35 becomes "OFF" and recording of the erase code is stopped. On the other hand, since flip-flop 34 is set by the coincidence signal to be outputted from the coincidence detection circuit 31 and the switch 36 becomes "ON" and simultaneously, the VSC data generator 33 starts generating the VSC signal, the VSC signal is supplied to the rotary head and recorded followed by the erase code. And since flip-flop 34 is reset when the generation of all VSC data is finished, the switch 36 becomes "OFF" and the recording function of VSC signal is terminated.

FIG. 9 shows an example of converting table for converting Zn into En in the erase code length computing circuit 28. In FIG. 9 the Zn (the length from the recording position end of PCM data to the edge of head switching pulse) is plotted along the abscissa and the En, the recording length of erase code to be recorded between PCM data and VSC data, is plotted along the ordinate. As shown in FIG. 9, the erase code length is arranged to become longer (or shorter) as Zn becomes bigger (or smaller). And when Zn is in the section between 4.5H and 6.0H (the section between points A and B), the erase code length En is increased rectilinearly from 1.1H to 1.85H. When Zn is in the section from 6.0 H to 7.6H (the section between points B and C), En is increased rectilinearly from 1.85H to 3.35H. When Zn is in the section from 7.6H to 9.1H (the section between points C and D), En will be increased rectilinearly from 3.35H to 4.1H.

Figure 10:
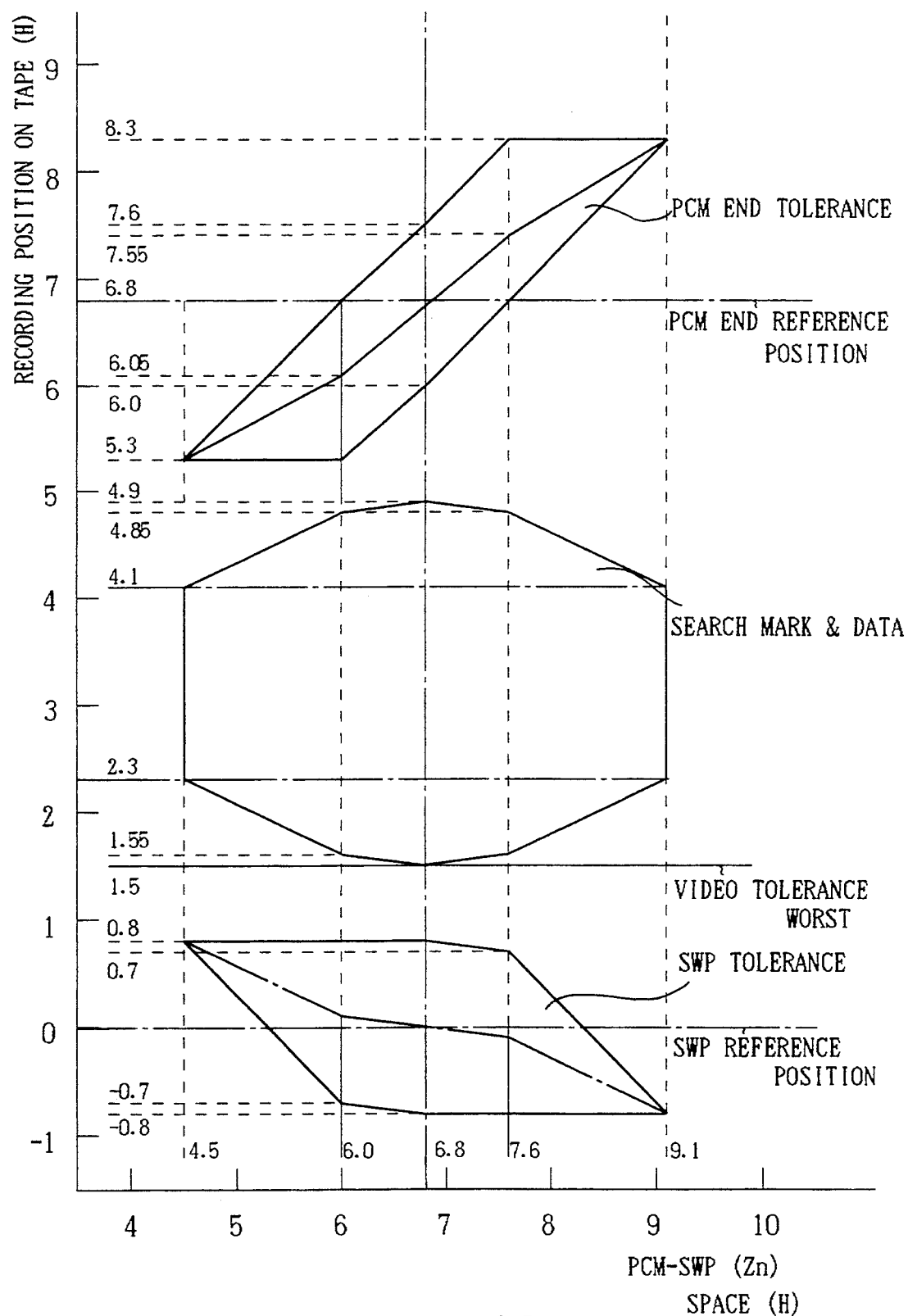
FIG. 10 is a diagrammatic chart illustrating changes of the recording position of VSC signal in the case where Zn changed according to the embodiment of FIG. 6.

FIG. 10 shows the recording position on the tape of VSC signal (search mark and data) in the case where it is recorded as discussed above. The axis of ordinate shows the recording position on the tape and corresponds to the axis of abscissa in FIG. 8. Also, the axis of abscissa in FIG. 10 corresponds to Zn. As discussed above, in an ideal condition wherein there is no aberration on the recording position of the head switching pulse and the PCM data end, the edge of switching pulse will be generated on the position of 0H (along the ordinate) and the recording position of PCM data end is at the position of 6.8H. And in this case, Zn (distance between PCM data end and switching pulse edge) (i.e., the position along the abscissa) is at the position of 6.8H.

The generating timing of switching pulse is allowed ±0.8H tolerance. And the aberration on the recording position of PCM data end is allowed ±1.5H tolerance. More specifically, in FIG. 10, the recording position of switching pulse changes between −0.8H to +0.8H centering around the standard position (OH) and the recording position of PCM data end moves within the range from 5.3H (=6.8−1.5) to 8.5H (=6.8+1.5).

In the case where Zn moved from 4.5H to 9.1H corresponding to the generating timing which moves within these ranges as shown in FIG. 9, if it is so arranged that the erase code length En is to fluctuate within the range from 1.1H to 4.1H, the recording position on the tape of VSC signal (search mark and data) fluctuates within the range from 1.5H to 4.9H as shown on the central portions of FIG. 10. The recording positions of switching pulse and PCM data end move within the range marked with dark shading centering around the position shown by a point chain line in each area.

Figure 11:
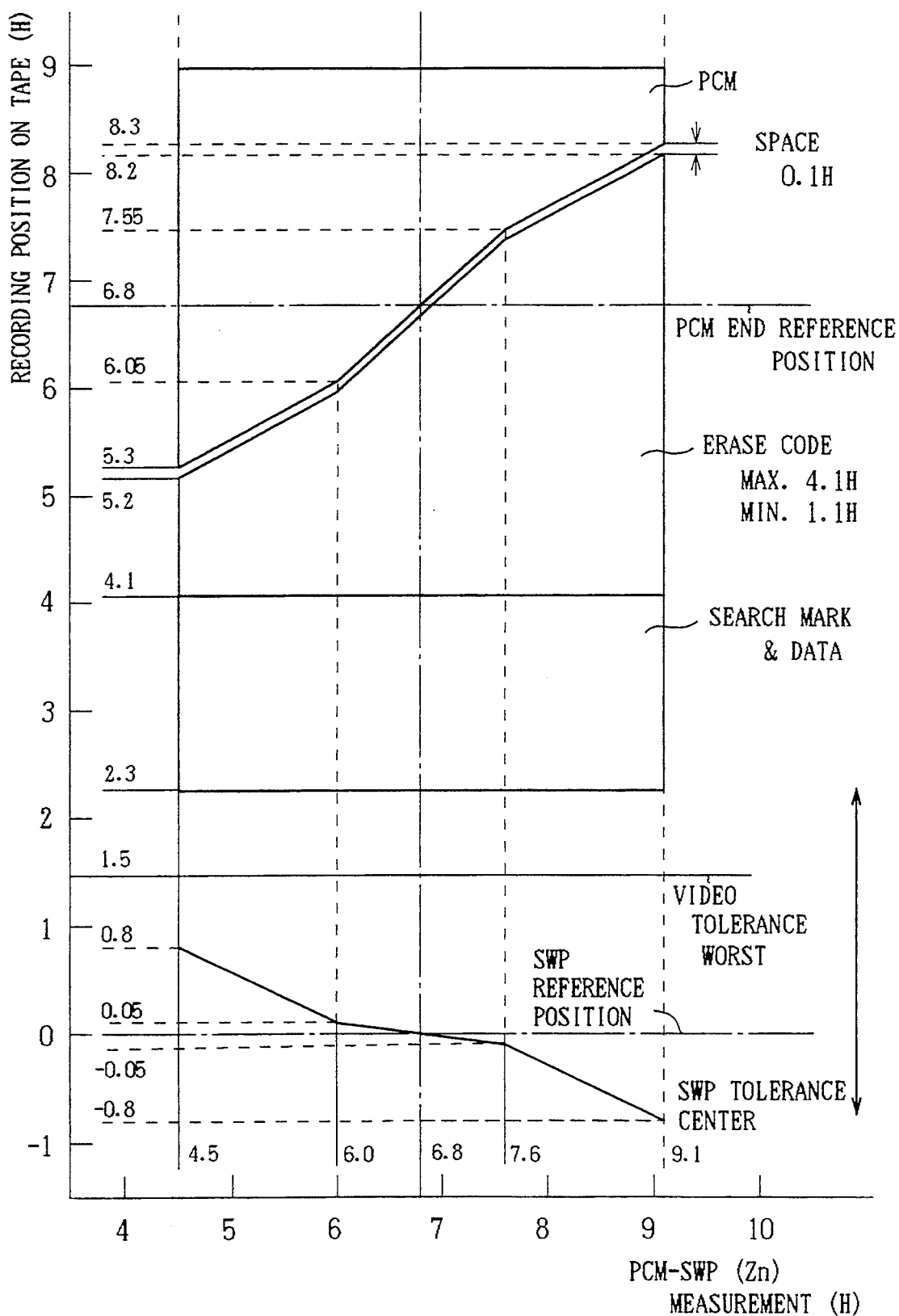
FIG. 11 is a diagrammatic chart illustrating changes of the recording position of VSC signal in the case where the deviation between switching pulse and PCM data end position is on the central position of a variable range in FIG. 10.

FIG. 11 shows the recording position of search mark and data and the recording position of erase code in the case where the recording positions of switching pulse and PCM data end (Zn) are on the central position as shown by a point chain line in FIG. 10. In this case, the search mark and data are recorded between 2.3H and 4.1H on the tape recording position, regardless of value of Zn. On the other hand, the erase code is started recording from the position of 5.2 h when Zn is 4.5H, and when Zn is 9.1H, recording is started from 8.2H position. Accordingly, the recording length of erase code En changes between 1.1H (=5.2−4.1) and 4.1H (=8.2−4.1), i.e., the changes of erase code length En in this case correspond to the conversion table of Zn and En in FIG. 9.

Figure 12:
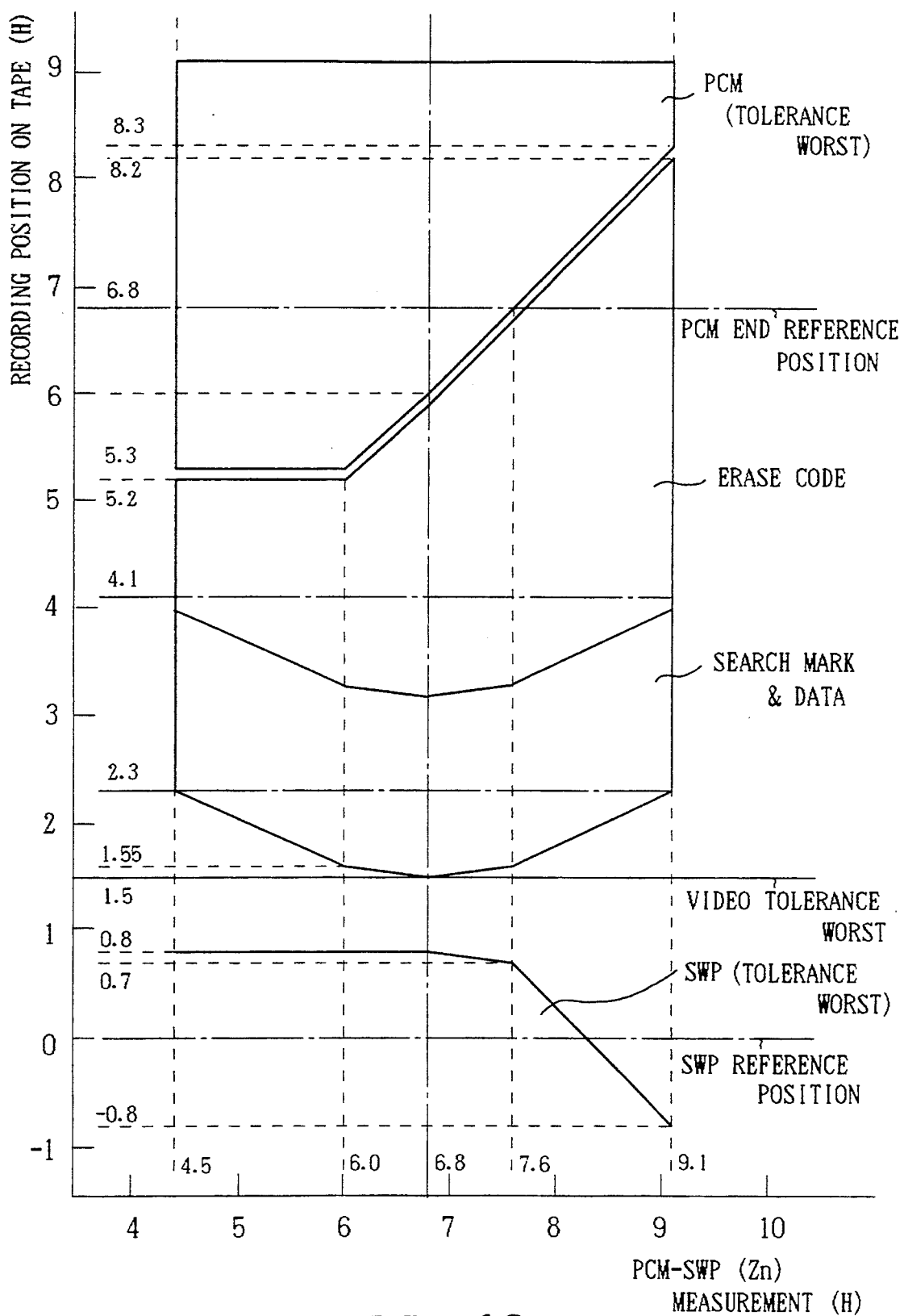
FIG. 12 is a diagrammatic chart illustrating the recording position of VSC signal and the recording length of erase code in the case where the position deviation of the switching pulse and PCM data end becomes the worst condition in the embodiment of FIG. 6.

FIG. 12 shows the case where the recording positions of switching pulse and PCM end are changed to the worst condition. More specifically, the switching pulse slipped out 0.8H toward the PCM data recording area side and the recording position of PCM data end slipped out 1.5H toward the switching pulse recording position side. In this case where the recording position of search mark and data as VSC signal is recorded within the range from 1.5H to 4.1H and it is found that the erase code length En changes within the range from 1.1H (=5.2−4.1) to 4.1H (=8.2−4.1).

Figure 13:
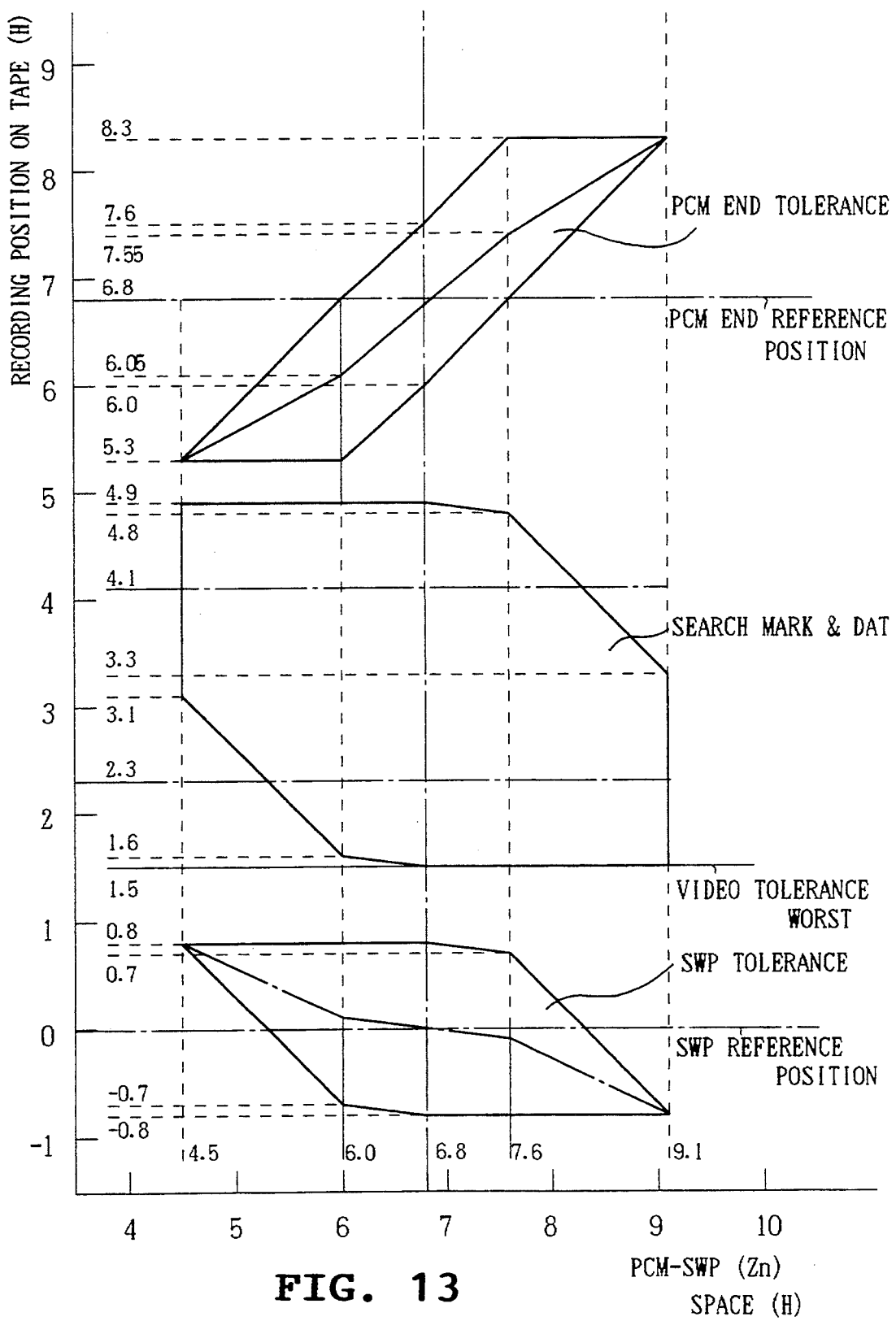
FIG. 13 is a diagrammatic chart illustrating the case corresponding to FIG. 10.
Figure 14:
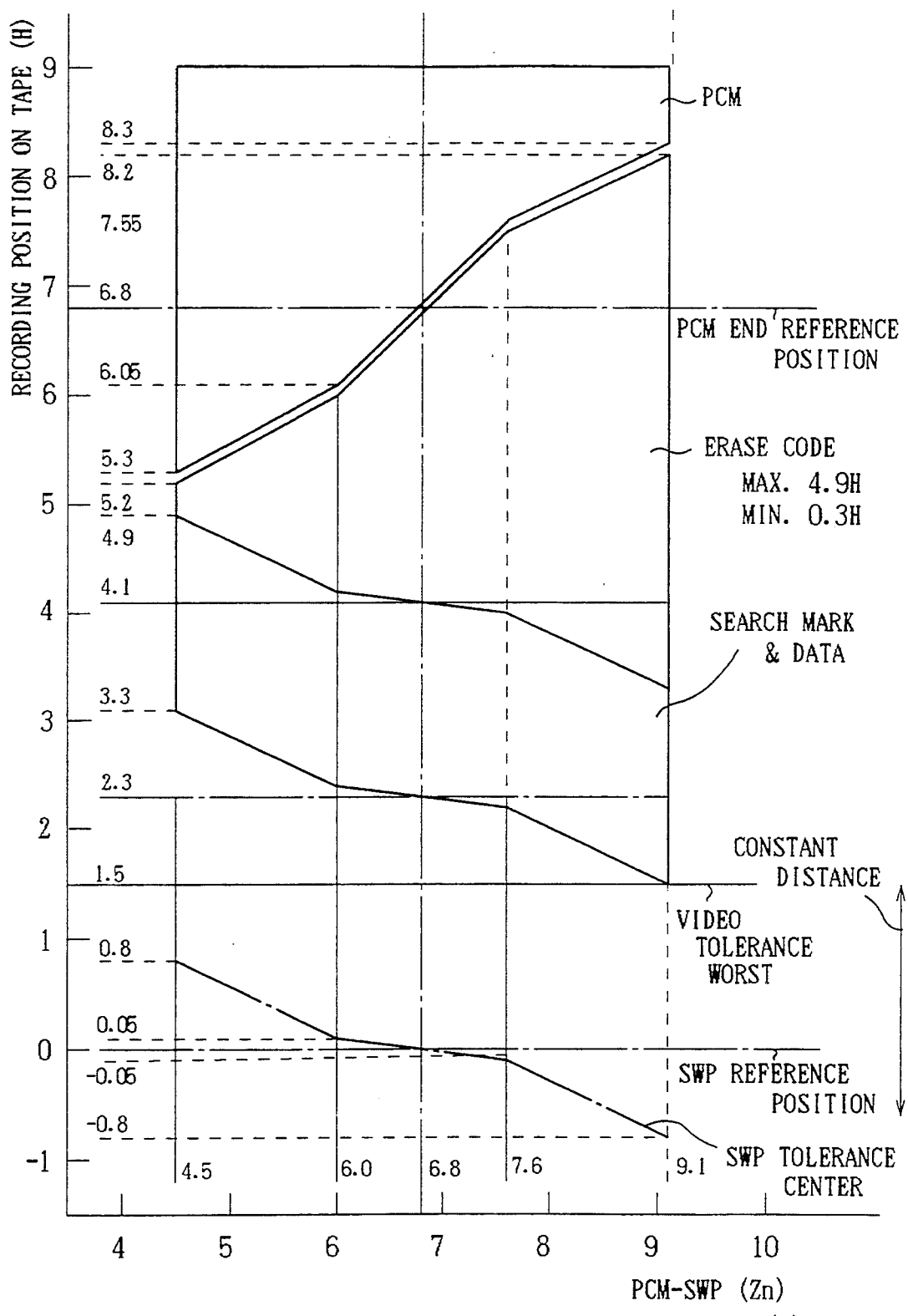
FIG. 14 is a diagrammatic chart illustrating the case corresponding to FIG. 11.
Figure 15:
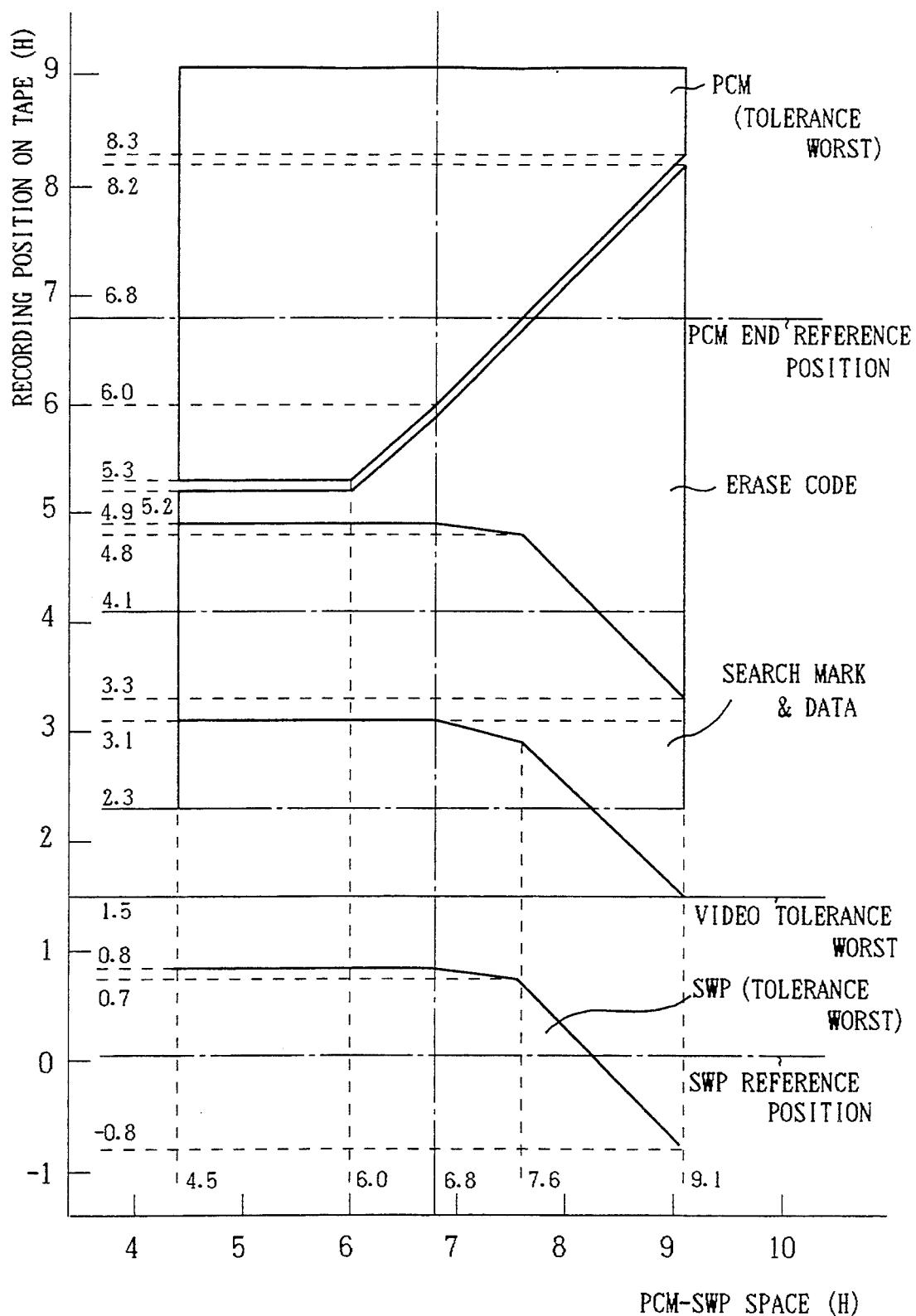
FIG. 15 is a diagrammatic chart illustrating the case corresponding to FIG. 12.

FIGS. 13 to 15 show changes of the recording position of VSC signal and the recording length of erase code which are shown in FIGS. 12 and 13 as conventional cases. FIGS. 13, 14 and 15 correspond to FIGS. 10, 11 and 12, respectively.

In the case where the switching pulse changes between ±0.8H and the recording position of PCM end moves within the range of ±1.5H, the recording position of VSC signal changes as shown in the central part of FIG. 13 with dark shading corresponding to changes of distance from the recording position of PCM data end to the edge of the switching pulse Zn. It is apparent that as compared with the range in FIG. 10, the range of this embodiment (FIG. 10) the more Zn deviates toward right or left from the standard position (position of 6.8H along the abscissa), the recording position of VSC signal is recorded close to the standard recording position (the range within 2.3H to 4.1H in the recording position on the tape).

Furthermore, in the case where the deviation of the recording position of the switching pulse and the PCM end is on the central position as shown with a point chain line in each range of FIG. 13, the recording position of search mark and data, as shown in FIG. 14, changes between 1.5H and 4.9H on the tape recording position. On the other hand, in the case of the present embodiment as shown in FIG. 11, the recording position falls within the range from 2.3H to 4.1H. Also, regarding the length of erase code, in the case of FIG. 14, when Zn is 9.1H, it becomes 4.9H (=8.2−3.3), however, when Zn is 4.5H, it becomes 0.3H (=5.2−4.9). On the other hand, according to the embodiment of FIG. 11, it falls in the value between 1.1H (=5.2−4.1) and 4.1H (=8.2−4.1).

FIG. 15 shows the condition of the worst case where the switching pulse deviates 0.8H toward the PCM data recording direction and recording position of PCM data end deviates 1.5H toward the direction of switching pulse edge generating timing position. In this case, the recording position of search mark and data move within the range from 1.5H to 4.9H on the tape recording position. On the other hand, in the case of the embodiment as shown in FIG. 12, search mark and data are recorded within the range from 1.5H to 4.1H. Also, the recording length of erase code, in the case of FIG. 15 where Zn is between 4.5H and 6.0H, becomes 0.3H(=5.2−4.9). On the other hand, in the case of present embodiment as shown in FIG. 12, it is apparent that at least the length of 1.1H (=5.2−4.1) is maintained.

In the above embodiments, the VSC signal is recorded to only the tape already recorded the PCM data. However, it is not limited to this. Also the VSC signal can be recorded to both of the tape not recorded the PCM data and the tape recorder.

For example, in the case where it is judged that the PCM data has not recorded on the basis of PCM existing/not existing detection output obtained by counting CRC significant numbers (FIG. 19), the erase code and the VSC code of predetermined length are recorded, at the timing of predetermined time passed from generation timing of edge of head switching pulse.

And, when judging the PCM data has recorded, as described above, VSC code is recorded with adjusting a recording position of VSC signal, corresponding to length from end position of PCM data to the switching position of rotary head.

As described above, recording method of VSC signal can be switched, corresponding to exist or not to exist PCM data.

As discussed above, according to the video tape recorder of the present invention, since it is so arranged that the recording position of VSC signal is adjusted corresponding to the length from the end of PCM data recording area to the switching position of revolving head, the recording position of VSC signal can be recorded close to the standard position, and the length between the PCM data end and the recording starting position of VSC signal can be sufficiently maintained.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A recording apparatus for recording a first information signal by a rotary head in a helical track on a recording medium which has said first information signal recorded on a first recording area, and a second recording area preceding said first recording area has a second information signal optionally recorded therein, comprising:
    (a) third information signal recording means for recording a third information signal between said first and second recording areas of said helical track;
    (b) means for determining a switch timing of said rotary head;
    (c) means for detecting a recording area end point of said second recording area; and
    (d) recording position adjusting means for adjusting a recording position of said third information signal based on said switch timing of said rotary head and said recording area end point of time of said second recording area.

2. A recording apparatus for recording a first information signal by a rotary head in a helical track on a recording medium which has said first information signal recorded in a first recording area, and a second recording area preceding said first recording area has a second information signal optionally recorded therein, comprising:
    (a) third information signal recording means for recording a third information signal between said first and second recording areas of said helical track; and
    (b) recording term adjusting means for adjusting a recording term of said third information signal based on a switch timing of said rotary head and on a recording area end point of time of said second recording area.

3. The recording apparatus according to claim 2, in which said recording term adjusting means comprises:
    (c) time measuring means for measuring a recording area end point of time of said second recording area on the basis of the switch timing of said rotary head; and
    (d) recording term length varying means for varying a length of said recording term of said third information signal based on an output of said time measuring means.

4. A recording apparatus for recording a first information signal by a rotary head in a helical track on a recording medium which has said first information signal recorded in a first recording area and a second recording area preceding said first recording area has a second information signal optionally recorded therein, and for recording a third information signal in a third recording area between said first and second recording areas, wherein the third recording area includes an erase code portion which is allotted a predetermined code for leaving the erase code portion of said third recording area unaffected during subsequent recording of said third information signal and an information portion for storing said third information signal, said apparatus comprising:
    (a) time measuring means for measuring a recording area end point of time of said second recording area on the basis of a switch timing of said rotary head; and
    (b) recording term length varying means for varying a length of a recording term of said erase code portion of said third recording area based on said measured recording area end point of time of said second recording area.

5. A recording apparatus for recording a first information signal by a rotary head in a helical track on a recording medium which has said first information signal recorded in a first recording area, and a second recording area preceding said first recording area has a second information signal optionally recorded therein, comprising:
- (a) third information signal recording means for recording a third information signal in the helical track between said first and second recording areas;
- (b) information signal detecting means for detecting whether a second information signal is present in said second recording area;
- (c) time measuring means for measuring a recording area end point of time of said second recording area on the basis of a switch timing of said rotary head;
- (d) recording term length varying means for varying a length of said recording term of said third information signal based on said time measuring means if said information signal detecting means detects a recorded second information signal; and
- (e) recording term length setting means for setting said recording term length of said third information signal to a predetermined length from said recording area end point of time of said second recording area measured by said time measuring means if said information signal detecting means does not detect a recorded second information signal.

6. A recording method for recording a third first information signal by a rotary head in a helical track on a recording medium which has a first information signal recorded in a first recording area, and a second recording area preceding said first recording area has a second information signal optionally recorded therein, comprising the steps of:
- (a) adjusting a recording term of said third information signal based on a switch timing of said rotary head and on a recording area end point of time of said second recording area; and
- (b) recording said third information signal in said helical track between said first and second recording areas.

7. The recording method according to claim 6, wherein said recording term adjusting step comprises the steps of:
- (c) measuring said recording area end point of time of said second recording area in accordance with the switch timing of said rotary head; and
- (d) varying a length of said recording term of said third information signal based on said measured recording area end point of time of said second recording area.

8. A recording method for recording a third information signal by a rotary head in a helical track on a third recording area of a recording medium which has a first information signal recorded in a first recording area and a second recording area preceding said first recording area has a second information signal optionally recorded therein, wherein said third recording area includes an erase code portion which is allotted a predetermined code for leaving the erase code portion of said third recording area unaffected during subsequent recording of said third information signal and an information portion for storing said third information signal, comprising the steps of:
- (a) measuring a recording area end point of time of said second recording area on the basis of a switch timing of said rotary head;
- (b) varying a length of a recording term of said erase code portion of said third recording area based on said measured recording area end point of time of said second recording area; and
- (c) recording said third information signal in said helical track between said first and second recording areas.

9. A recording method for recording information signals by a rotary head in a helical track on a recording medium which has a first information signal recorded in a first recording area, and a second recording area preceding said first recording area has a second information signal optionally recorded therein, comprising the steps of:
- (a) detecting whether a second information signal is present in said second recording area;
- (b) measuring a recording area end point of time of said second recording area on the basis of a switch timing of said rotary head;
- (c) varying a length of a recording term of a third information signal based on said measured recording area end point of time of said second recording area if said second information signal is present; and
- (d) setting said recording term length of said third information signal to a predetermined length from said recording area end point of time if said second information signal is not present; and
- (e) recording said third information signal in the helical track between said first and second recording areas.

10. A recording method for recording a third information signal by a rotary head in a helical track on a recording medium which has a first information signal recorded in a first recording area, and a second recording area preceding said first recording area has a second information signal optionally recorded therein, comprising the steps of:
- (a) determining a switch timing of said rotary head;
- (b) detecting a recording area end point of time of said second recording area;
- (c) adjusting a recording position of said third information signal based on said switch timing of said rotary head and the detected recording area end point of time of said second recording area; and
- (d) recording in said adjusted recording position said third information signal in said helical track between said first and second recording areas.

* * * * *